Nov. 24, 1970     J. D. KENNELLY     3,543,234
HIDDEN SIGNAL LIGHT FOR UNMARKED EMERGENCY VEHICLE
Filed July 3, 1968     2 Sheets-Sheet 1
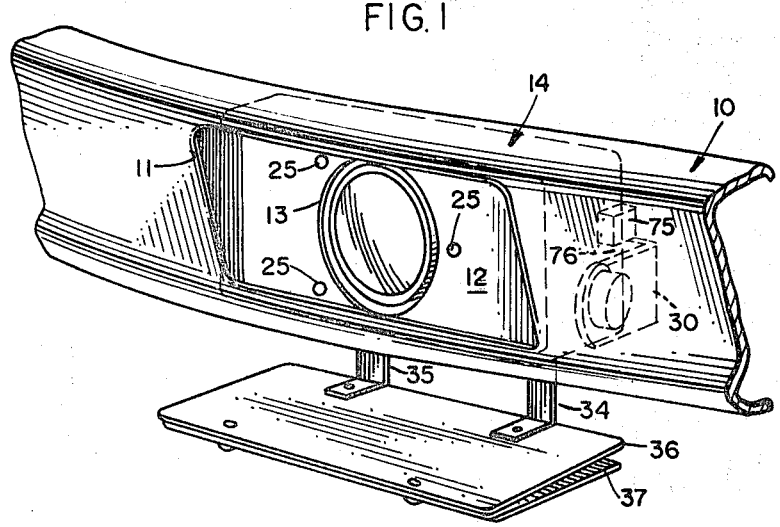
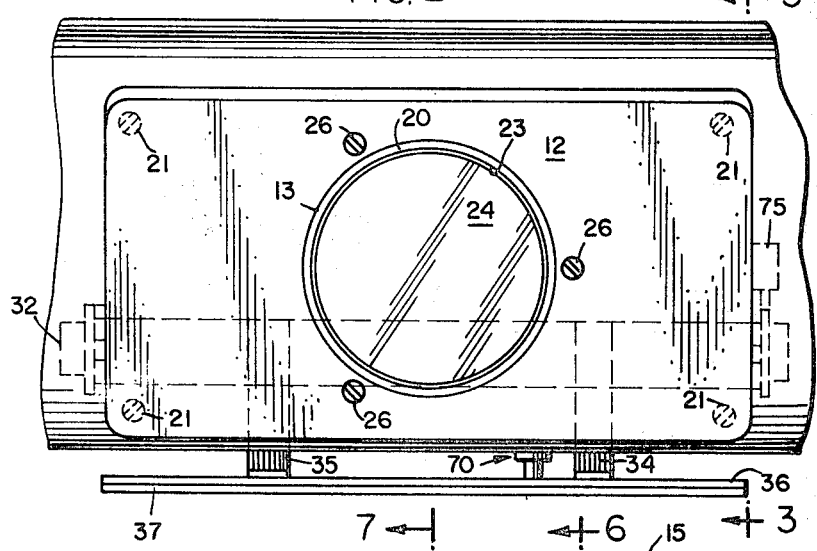
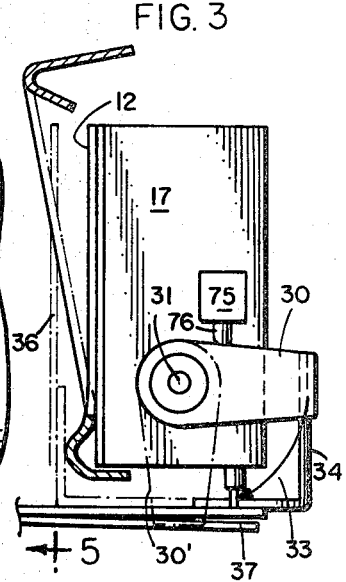
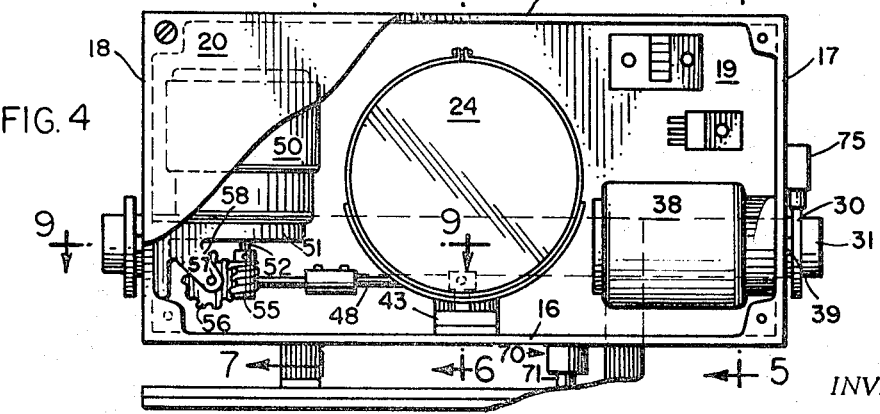
INVENTOR:
JEREMIAH D. KENNELLY
BY
Dawson, Tilton, Fallon & Lungmus
ATT'YS Nov. 24, 1970  J. D. KENNELLY  3,543,234
HIDDEN SIGNAL LIGHT FOR UNMARKED EMERGENCY VEHICLE
Filed July 3, 1968  2 Sheets-Sheet 2
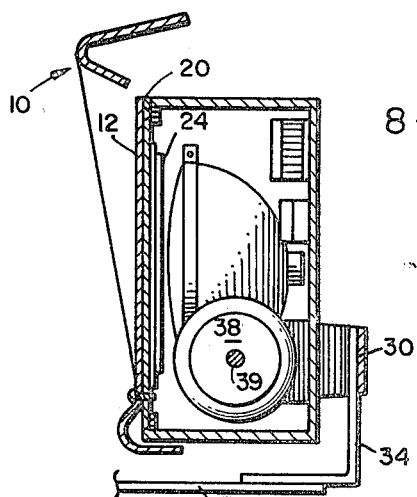
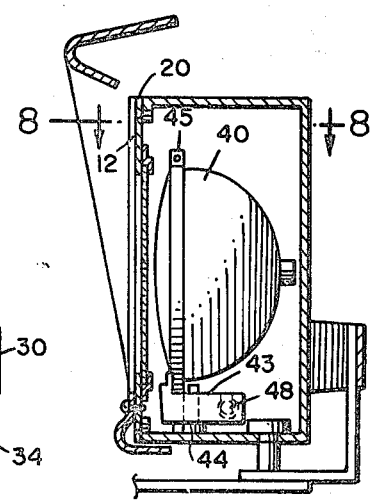
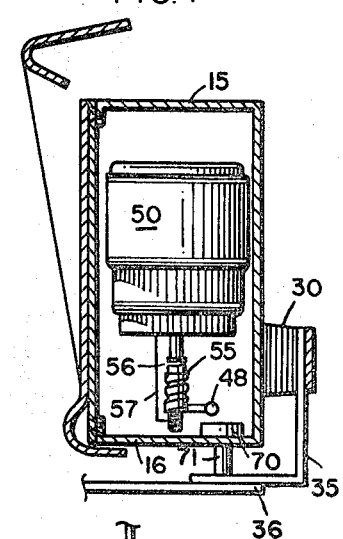
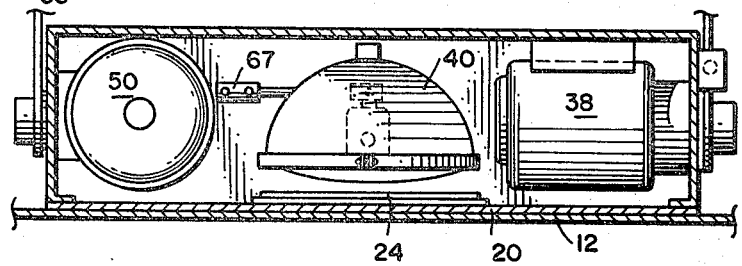
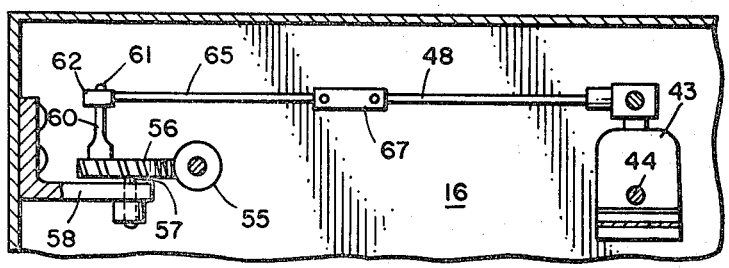
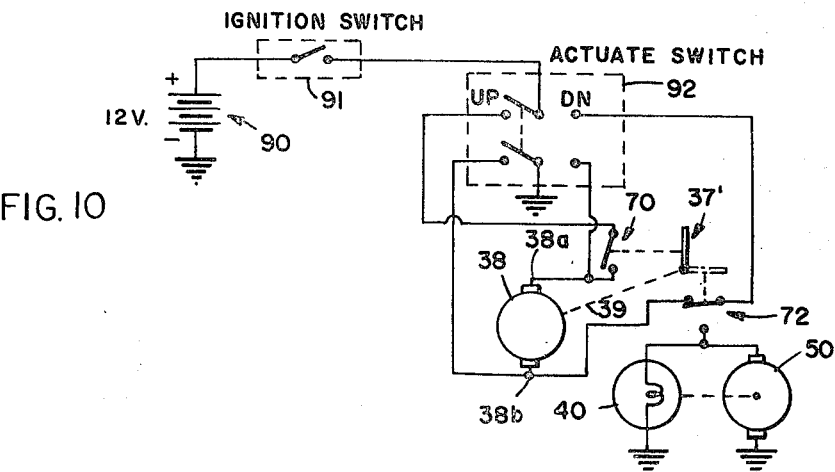
INVENTOR:
JEREMIAH D. KENNELLY
BY
Dawson, Tilton, Fallon & Lungmus
ATT'YS

United States Patent Office 3,543,234
Patented Nov. 24, 1970

3,543,234
HIDDEN SIGNAL LIGHT FOR UNMARKED EMERGENCY VEHICLE
Jeremiah D. Kennelly, Oak Park, Ill., assignor to Mars Signal Light Company, Chicago, Ill., a corporation of Illinois
Filed July 3, 1968, Ser. No. 742,244
Int. Cl. B60q 1/26
U.S. Cl. 340—102                                9 Claims

ABSTRACT OF THE DISCLOSURE

An alarm signal light is mounted behind the front bumper of an emergency vehicle and hidden during normal use by the license plate. A switch actuates a swing bracket on the housing for the light to rotate the license plate beneath it, and thereby uncover the light during emergency conditions. When the license plate is thus rotated, another switch is automatically actuated to stop the rotation of the plate and to couple energy to the lamp and to force the lamp in oscillatory motion to clear the way for the vehicle.

BACKGROUND

The present invention relates to a signal light for an emergency vehicle; more particularly, it relates to a signal light which is particularly suited for use on an unmarked vehicle and which may be selectively uncovered as desired.

It has been found that a bright light oscillating from side to side and shining at about the eye level of oncoming drivers (i.e. impinging on the windshields of their automobiles) is a very effective method of clearing a street for an emergency vehicle, such as a squad car, under alarm conditions. Ordinarily, such emergency vehicles are clearly marked as such; and so the signal lights can be placed in the front of the grille of the car or mounted on its roof.

Today, however, there is an increasing trend, particularly in the federal and local investigative agencies, to provide law officers or fire officials with unmarked cars. Hence, it becomes desirable to provide such cars with emergency signal lights, which, in ordinary usage, are not detectable so that the function of the unmarked car is not noticeable. Most of these unmarked cars presently install a rotating signal light in the center of the dashboard of the vehicle or on the headboard behind the rear seat. Such lights are, of course, easily noticeable and the main advantage to not marking the car is therefore lost.

The present invention, therefore, provides an emergency signal light for an unmarked vehicle which in ordinary usage is hidden from view and which may be selectively uncovered and energized to clear the path ahead of the vehicle and to give warning to on-coming vehicles when it is desired to rush the emergency vehicle to another location.

SUMMARY

The present invention provides a generally box-shaped casing which is adapted to be mounted to the front bumper of an emergency vehicle just behind the cavity provided for its license plate. A weather-proof casing houses a light adapted for a sealed-beam lamp which is mounted for oscillatory motion about a vertical axis to provide a side-to-side sweeping light beam. A lens in the faceplate of the casing is mounted in register with a corresponding aperture in the bumper; and the license plate is supported by means of a swing bracket mounted to the sides of the casing for rotation between a first position in which the license plate covers the aperture and lens, and a second position in which the license plate uncovers the aperture and lens.

A switch, when actuated, rotates the swing bracket and license plate to the second or lowered position; and a limit switch is engaged by the swing bracket when the license plate is fully lowered. Actuation of this limit switch de-energizes the motor which lowers the license plate, couples electricity to the lamp filament, and energizes the motor which forces the lamp in oscillation. When the actuation switch is turned to the up position, the license plate is raised to its usual position to cover the lens. This motion de-energizes the lamp filament and the oscillator motor. A second limit switch is actuated when the license plate is fully raised to shut off the swing bracket drive motor.

Thus, the present invention provides a mechanism for selectively covering and uncovering an emergency signal light which may be used in combination with the bumper of such vehicle and which, in its hidden state, is covered or masked by the front license plate of the vehicle. Other features and advantages of the present invention will be apparent to persons skilled in the art from the following detailed description of a preferred embodiment accompanied by the attached drawing wherein identical reference characters will refer to like parts in the various views.

THE DRAWING

FIG. 1 is a perspective view of a fragmentary section of an automobile bumper with the inventive signal light installed behind it;

FIG. 2 is a front elevation view of the bumper and signal light of FIG. 1;

FIG. 3 is a cross section view showing the side of the casing in swing bracket taken through the sight line 3—3 of FIG. 2;

FIG. 4 is a front elevation view of the demounted signal light of FIG. 1 with the faceplate partially cut away;

FIGS. 5–7 are vertical cross section views taken in different locations along the signal light as indicated in FIG. 4;

FIG. 8 is a horizontal cross section view taken along the sight line 8—8 of FIG. 6;

FIG. 9 is a detailed view taken along the line 9—9 of FIG. 4 showing the mechanism for oscillating the lamp; and FIG. 10 is a schematic diagram of the electrical circuitry for using the emergency signal light.

DETAILED DESCRIPTION

Referring first to FIG. 1, reference numeral 10 generally designates a conventional front bumper as might be standard equipment on an unmarked emergency vehicle. The front portion of the bumper 10 is slightly forwardly inclined; and it defines a three-sided aperture 11 formed by a cut out plate portion 12 which is forced backward into a generally vertical disposition (see FIG. 3) thus forming a cavity for receiving a license plate. Such license plate is conventionally mounted directly to the mounting plate 12.

The present invention contemplates forming an aperture 13 in the plate 12 and mounting an emergency signal light generally designated 14 in FIG. 1 behind the bumper mounting plate 12.

As seen better in FIG. 4, the signal light 14 includes a generally box-shaped housing or casing having a top 15, a bottom 16, first and second sides 17 and 18, a back 19, and a faceplate 20 (only fragmentarily shown in FIG. 4). The top 15, bottom 16, sides 17 and 18, and back 19 form an integral casing; and the faceplate 20 is removably secured by means of four corner bolts 21 (see FIG. 2). The faceplate 20 defines a central aperture 23 mounted to register with the aperture 13 of plate 12. Behind the aperture 23 is mounted a lens 24 which may be a conventional flat piece of clear plate glass.

Three bolt-receiving apertures, designated 25 in FIG. 1 receive bolts 26 (FIG. 2) which are then threadably received by the faceplate 20 of the signal light housing for mounting the same to the bumper mounting plate 12.

Referring now to FIGS. 2 and 3, a U-shaped swing bracket 30 is pivotally mounted respectively to the sides 17 and 18 of the casing, as at 31 (FIG. 3) and 32 (FIG. 2). As illustrated in FIG. 3, the swing bracket 30 extends behind the back 19 of the casing for the signal light; and it is adapted for movement to a position beneath the signal light casing as shown in chain line identified by reference numeral 30; the movement being indicated by the arrow 33. First and second angle brackets 34 and 35 extend from the back of the swing bracket 30 and are provided with forwardly-extending portions for receiving a mounting plate 36 to which is fastened a conventional automobile license plate 37. As illustrated in FIGS. 1 and 3, when the swing bracket 30 extends directly rearward of its pivotal mounting 31, the license plate 37 extends below the bumper; however, when the swing bracket 30 is rotated a quarter turn clockwise in FIG. 3 to a position beneath the signal light housing, the license plate assumes its normal position which covers the aperture 13 and lens 24.

A conventional twelve-volt DC motor generally designated by reference numeral 38 in FIG. 4 is mounted within the signal light housing and has a shaft 39 which is connected to the swing bracket 30 for rotation. As will be explained in greater detail within, the motor 38 will move the swing bracket 30 to its rearward or downward positions depending upon the direction of its field current. The motor 38 (herein sometimes referred to as the swing bracket drive motor) and its associated drive shaft 39 connected to the bracket 30 are seen in side elevation in FIG. 5.

A conventional sealed-beam head lamp, denoted by reference numeral 40, is pivotally mounted directly behind the lens 24 by means of a bracket 43 fitted on a vertically-extending bushing 44. A lamp ring 45 is mounted to the bracket 43 and holds the lamp 40 in place. The bracket 43 is permitted to rotate about a vertical axis defined by the bushing 44.

The lamp 40 is moved in side-to-side oscillatory motion by reciprocation of a connecting rod 48 which is coupled to a rearwardly-extending portion of the bracket 43.

In order to obtain the required reciprocation of the connecting rod 48, a second twelve-volt DC motor 50 is mounted within the signal light casing on a bracket 51 (see FIG. 4). The motor 50 has a downwardly-extending shaft 52 on the end of which is mounted a conventional worm drive 55. In mesh with the worm drive 55 is a worm gear 56 which is pivotally mounted on a pin 57 journaled in an extension of the bracket 51 designated by reference numeral 58.

Turning now to FIG. 9, the worm gear 56 is provided with a rearward extension 60 mounted eccentrically with respect to the shaft 57 on which the gear 56 is journaled. The extension 60 is provided as its rear-most end with a ball 61 on which is seated a ball joint 62. A connecting rod 65 interconnects the ball joint 62 with the previously-described connecting rod 48 by means of a doubly-threaded sleeve 67.

When the motor 50 is energized, it drives the worm 55 in rotation about a vertical axis defined by the motor drive shaft 52 thus rotating the worm gear 56 about a horizontal axis. The eccentric extension 60 will therefore move in a circular path; and the ball joint 62 will be carried along with it, thus reciprocating the arm 65 and forcing the lamp mounting bracket 43 side-to-side oscillatory motion about its mounting bushing 44 (FIG. 9).

A first limit switch designated by reference numeral 70 in the drawing and having a plunger or movable contact 71 is mounted to the bottom 16 of the signal light casing with the plunger 71 extending beneath the bottom 16 and engageable by the swing bracket 30 when the same extends in its downward position. Thus, the limit switch 70 is actuated when the license plate is in a position which covers the lens 24. A second limit switch 75 (see FIG. 1) having a plunger 76 is mounted to the side 17 of the signal light housing; and it is engaged by the swing bracket 30 when the swing bracket is in a rearwardly-extending position as illustrated in FIG. 3. This, of course, occurs when the license plate 37 is in a position in which the lens 24 is uncovered.

Turning now to FIG. 10, the battery for the emergency vehicle is illustrated schematically and designated by reference numeral 90; and an ignition switch 91 is connected in series with one of the battery terminals. In series with the ignition switch 91 is an "actuate" switch designated schematically by reference numeral 92 and comprising a double-pole, double-throw toggle switch having a first position marked "UP" and a second position marked "DN" (indicating down). These position indicators refer to the position of the license plate 37. The ignition switch 91 is connected directly to the top moveable contact of the actuate switch 92; and the other moveable contact is grounded.

The license plate is schematically illustrated in FIG. 9 and denoted by reference numeral 37'. One fixed terminal of the UP position of switch 92 is connected to the moveable contact of switch 70 the fixed contact of switch 70 is connected to one of the field windings (38a) of the motor 38 which drives the shaft 39 to move the swing bracket 30 for rotating the license plate 37'. The other fixed contact of the UP position of switch 92 is connected to the other terminal of the field winding (38b) of the motor 38 and to one fixed contact of the limit switch 72. The other fixed contact of the limit switch 72 is connected to the filament of the lamp 40 and to the field winding of the motor 50 which drives the lamp 40 in oscillatory motion.

One of the fixed contacts of the DN position of switch 92 is connected to the moveable contact of the switch 72; and the other fixed contact of the DN position of the switch 92 is connected in common with the fixed terminal of switch 70 and its associated terminal 38a of the field winding of the motor 38.

In operation, if the license plate is in its downward position (assuming the ignition switch is closed), the schematic showing of the license plate 37' will actuate the switch 72 to couple energy from the battery 90 through the ignition switch 91, the upper fixed terminal of the DN position of the actuate switch 92 to the filament of the lamp 40 and to the field winding of motor 50 which drives the lamp 40 in oscillatory motion. As long as this actuate switch remains in the down position, the lamp 40 is oscillated and its filament is energized.

When the actuate switch 92 is moved to UP position if the license plate has been in the lowered position, power is coupled through the switch 92, the limit switch 70 (which is closed at the time) and through the terminal 38a of the motor 38 to rotate the license plate to its uppermost position. At this time, the terminal 38b of the motor 38 is grounded through the lower fixed contact of the UP position of the actuate switch 92. As soon as the swing bracket 30 leaves its back position, the lamp 49 is stopped and shut off. When the license plate 37' reaches its vertical position, the limit switch 70 will be opened to de-energize the motor 38 and the license plate will then remain in this covering position. If the actuate switch is then moved to the DN position, the field current to the motor 38 is reversed by grounding the terminal 38a through the lower fixed terminal of the DN position of the switch 92 and by coupling the battery through the upper fixed contact of the DN position of the switch 92 and through the then-closed switch 72 to the terminal 38b of the motor 38. This reverses its field current and causes the license plate 37' to be rotated until it is lowered completely at which time the moveable contact of the switch 72 will change positions to de-energize the drive motor 38 and to energize the filament of the lamp 40 and the field winding of the motor 50 to move the lamp 40 in oscillatory motion.

It will thus be appreciated that the present invention provides a signal light for unmarked emergency vehicles, which, in combination with the front bumper of the vehicle, remains hidden or covered by the front license plate until such time as the operator pushes an actuate switch to a "down" position. This action will cause a drive motor to move the swing bracket to its rearward most position thereby lowering the license plate and uncovering the front lens. When the license plate is in its lowermost position, the lamp filament is excited and a second drive motor moves the lamp in oscillatory motion. When the actuate switch is then turned to an "up" position, the drive motor moves the swing bracket to its upper position thereby raising the license plate to its covering position and when the same is achieved, a limit switch senses this and de-energizes the drive motor.

Having thus described in detail a preferred embodiment of the inventive signal light, it will be apparent to persons skilled in the art that certain substitutions and modifications may be made for the structure which was disclosed in detail without departing from the principle of the invention; and it is, therefore, intended that all such modifications and substitutions be covered as they are embraced within the spirit and scope of the appended claims.

I claim:

1. For use with an automobile bumper defining an aperture, the combination comprising a housing mounted behind said bumper and hidden thereby, said housing including a lens adjacent said aperture and in register therewith, plate means adapted to receive a license plate mounted to said housing for movement between a first position covering said aperture and a second position exposing said aperture, a lamp in said housing adapted to transmit light through said lens and aperture when energized, and means including actuate switch means for selectively moving said plate means between said first and second positions.

2. The apparatus of claim 1 further comprising limit switch means actuatable only when said plate means is in said second position for energizing said lamp.

3. The apparatus of claim 1 wherein said lamp is mounted in said housing for oscillatory motion about a vertical axis, and further comprising motor means coupled to said lamp for driving the same in said oscillatory motion, and limit switch means actuated by said plate means only when the same is in said second position for energizing said motor means and said lamp whereby an oscillating light beam is transmitted through said lens and aperture after said plate means uncovers the same.

4. The apparatus of claim 3 wherein said means for selectively moving said plate means includes a motor adapted to be energized in a forward and a reverse direction by said actuate switch means and connected to said plate means.

5. The combination of claim 4 wherein said housing comprises a generally box-shaped cabinet having a faceplate mounted to the rear of said bumper and holding said lens adjacent said aperture in said bumper.

6. The combination of claim 5 wherein said plate means further includes a swing bracket defining first and second arms pivotally mounted to the sides of said housing and adapted to be driven by said motor energized by said actuate switch, said swing bracket adapted for movement between a first position beneath said cabinet and a second position behind said cabinet, angle bracket means connected to said swing bracket and extending in front of said bumper in said first position, and a plate supported by said angle brackets and adapted to receive said license plate.

7. The apparatus of claim 6 wherein said limit switch means is secured to a side of said cabinet and actuatable by said swing bracket when the same is in said second position to energize said light and said oscillatory motor.

8. The apparatus of claim 7 further comprising second limit switch means mounted to the bottom of said cabinet and actuatable by said swing bracket when the same is in said second position to de-energize said swing bracket and drive motor.

9. The apparatus of claim 6 wherein said actuate switch has an "up" position and a "down" position, said actuate switch being connected in circuit with said swing bracket drive motor to rotate said swing bracket to said "up" position and to a "down" position when said actuate position is in its "down" position, said actuate switch being further connected in circuit with said first limit switch, for energizing said lamp and its associated oscillatory motor when said license plate is in its lower position.

References Cited

UNITED STATES PATENTS 2,231,312  2/1941  Ache _____ 240—7.1

DONALD J. YUSKO, Primary Examiner

M. SLOBASKY, Assistant Examiner

U.S. Cl. X.R.

240—7.1